United States Patent [19]

Luthra et al.

[11] Patent Number: 4,963,020
[45] Date of Patent: Oct. 16, 1990

[54] DETECTION OF SPLICES IN AN OPTICAL FIBER

[75] Inventors: Ajay K. Luthra, Beaverton; Dean Messing, Aloha, both of Oreg.

[73] Assignee: Tektronix, Inc., Beaverton, Oreg.

[21] Appl. No.: 347,709

[22] Filed: May 5, 1989

[51] Int. Cl.⁵ .......................................... G01N 21/88
[52] U.S. Cl. .................................................. 356/73.1
[58] Field of Search ....................................... 356/73.1

[56] References Cited

U.S. PATENT DOCUMENTS 4,821,038 3/1989 Nazarathy et al. ................ 356/73.1

Primary Examiner—Vincent P. McGraw
Attorney, Agent, or Firm—Francis I. Gray

[57] ABSTRACT

A method of detecting a splice in an optical fiber in the presence of noise generates a nulling filter from a segment of a signal received from the optical filter by determining a set of coefficients having an initial "1" followed by p-1 "0" values and $w_i$ finite impulse response filter values, where p is a prediction interval greater than the width of an expected splice signature. The received signal is processed by the nulling filter to remove exponentials from the received signal, leaving an error signal containing noise and splice information. The resulting error signal is processed by a correlation filter to reduce the noise in the error signal. The output from the correlation filter results in a noise reduced error signal with the splice appearing as a noticeable dip in the waveform. The waveform is passed through a threshold detector to identify the splice when the dip exceeds a predetermined threshold.

5 Claims, 3 Drawing Sheets

DETECTION OF SPLICES IN AN OPTICAL FIBER

BACKGROUND OF THE INVENTION

The present invention relates to time domain reflectometry, and more particularly to a method of detecting splices in an optical fiber using a two stage filter process applied to noisy data samples acquired by an optical time domain reflectometer.

In an optical time domain reflectometer (OTDR) a light pulse is transmitted through an optical fiber and a reflected signal is received from the optical fiber due to Rayleigh backscattering. The received signal is generally averaged over many transmitted pulses to reduce the noise and is in the form of one or more decaying exponentials with small breaks The decays correspond to the loss characteristics of the optical fiber and sometimes to the artifacts due to a detector in the receiver of the OTDR, and the breaks correspond to splices, either fusion or reflective, that may exist in the optical fiber. As the transmitted light pulse travels through the optical fiber it looses power and the signal to noise ratio (SNR) degrades with the distance traveled. The result is that for small splice losses, i.e., small power losses across a splice joint, a splice in the resulting return signal when displayed may not be readily apparent to an operator since it is lost in the noise. What is desired is a method of detecting splices in an optical fiber in the presence of noise so that the location and amplitude of the splice loss may be determined.

SUMMARY OF THE INVENTION

Accordingly the present invention provides a method of detecting splices in an optical fiber by using a two stage filter process to remove one or more exponentials from the return signal and to reduce the noise. The exponentials are removed by using a linear prediction filter that is adaptive and adjusts its weights depending upon the decay rates of the exponentials. The weights are obtained by forming the linear prediction filter such that, when a small portion of the returned signal is passed through it, the output power is minimized. Once the linear prediction filter is formed the entire signal is passed through it to produce an error signal that represents the noise plus breaks, or splices, in the optical fiber. The noise is then suppressed using a matched correlation filter. The noise suppressed error signal is then passed through a threshold detector to detect the presence of a splice.

The objects, advantages and other novel features of the present invention are apparent from the following detailed description when read in conjunction with the appended claims and attached drawing.

DESCRIPTION OF THE PREFERRED EMBODIMENT

Figure 1:
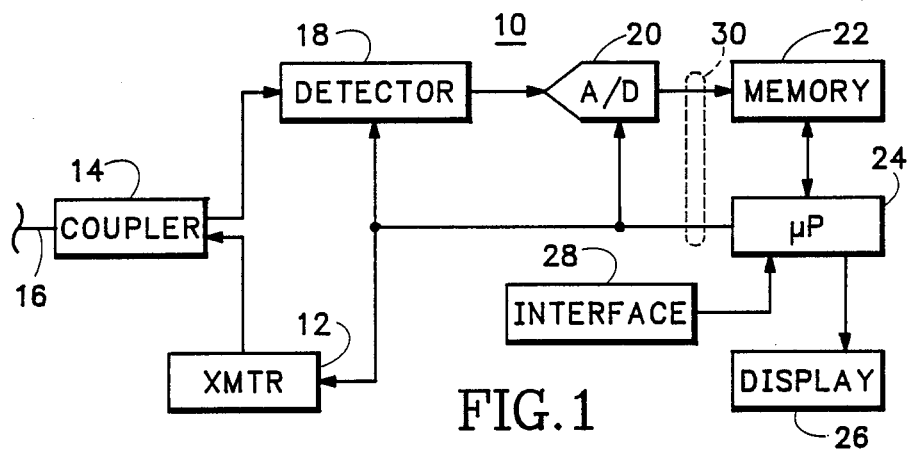
FIG. 1 is a block diagram of an optical time domain reflectometer that uses the splice detection method of the present invention.

Referring now to FIG. 1 an optical time domain reflectometer (OTDR) 10 is shown having an optical transmitter 12 that transmits a light pulse via a coupler 14 into an optical fiber 16. The Rayleigh backscattered return signal from the optical fiber 16 is passed by the coupler 14 to a detector 18, the output of which is sampled by an analog to digital converter 20 and stored in a suitable memory device 22. A microprocessor 24 controls the pulse repetition frequency and pulse width of the transmitted light pulse as well as the sample start time, data duration and sample rate for the received signal. The microprocessor 24 then processes the received data stored in the memory device 22 to generate a display on a suitable display device 26 that includes both an analog display and an alphanumeric display, the information displayed and the various operating parameters being determined by an operator from a control interface 28. The microprocessor 24 may be an integral part of the OTDR 10, or may be a separate device that communicates with the OTDR over a suitable interface bus 30.

The first stage of the algorithm removes the decaying exponential portions of the return signal, leaving only splice information and noise. To accomplish this purpose a generalized linear prediction filter is used to predict future samples of the signal from which actual future samples are subtracted as they become available. The ideal backscattered Rayleigh return can be perfectly predicted, but the splices cannot, so that the resulting difference or error signal reflects only splice information and noise.

Figure 2A:
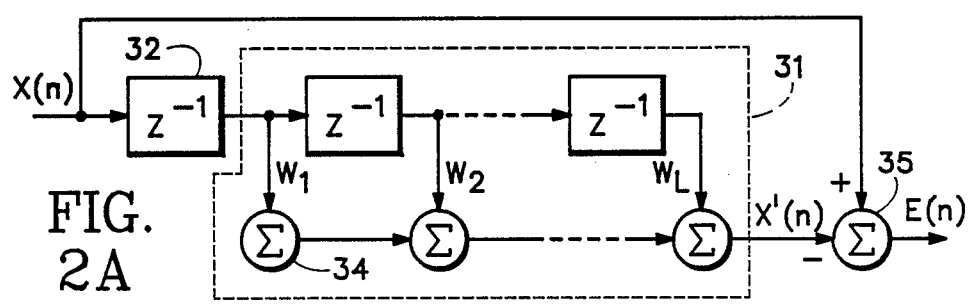
FIG. 2a is a schematic representation of a linear prediction filter.

If $x(n)$ is the input sequence of samples to be predicted, then in linear prediction some linear combination of past samples of $x(n)$ are found that give a good estimate of the sample coming next. In other words some weighting constants are determined such that $$x'(n) = w_1 x(n-1) + w_2 x(n-2) + \ldots + w_L x(n-L) \quad (1)$$

where $w_i$ are weighting constants to be determined and $x'(n)$ is the desired estimate of $x(n)$. The $w_i$ are found by minimizing the energy of the error between the true sequence $x(n)$ and the estimated sequence $x'(n)$ $$SUM\{E^2(n)\} = SUM[\{x(n) - x'(n)\}^2] \quad (2)$$

where the sum is over the values of $n = L$ to $n = N - 1$. From equation (1), which describes a convolution, it is apparent that a linear predictor is a discrete time finite impulse response (FIR) filter whose output is an estimate of the next input sample where L is the order of the filter. With a noiseless signal one tap per exponential is sufficient to predict the exponentials perfectly. However, when the signal is noisy, more than one filter tap per exponential is necessary. This FIR filter 31 is represented in FIG. 2a by the $Z^{-1}$ delay elements 32 and the summers 34. To generate a prediction error signal, $E(n)$, the prediction output, $x'(n)$, of the FIR filter 31 is subtracted in a further summer 35 from the actual input signal, $x(n)$. It is the minimization of this error signal by adaptively varying the weights, $w_i$, that is desired. N in equation (2) above is the length of the data record used in solving for $w_i$ to minimize the error signal, E. The sum must be over at least L samples so that N is equal at least to 2L, and is usually chosen to be at least 4L. The present algorithm uses a generalized form of linear prediction where, not the next sample, but the pth future sample is predicted. This allows the filter, acting on the signal before a splice, to predict the signal after the splice, the splice typically being smeared over several samples by the width of the light pulse. Therefore the generalized form of equation (1) becomes $$x'(n+p-1)=w_1x(n-1)+w_2x(n-2)+\ldots +w_Lx(n-L) \quad (3)$$

By shifting the origin forward by $p-1$ samples, equation (3) appears in a more conventional form as $$x'(n)=w_1x(n-p)+w_2x(n-p-1)+\ldots +w_Lx(n-p-L+1) \quad (4)$$

It is the error signal, E(n), associated with the generalized linear predictor that is of interest since it is this error signal that contains the splice information.

Again, the weights, $w_i$, are found by minimizing $$SUM\{E^2(n)\}=SUM[\{x(n)-x'(n)\}^2] \quad (5)$$

Figure 2B:
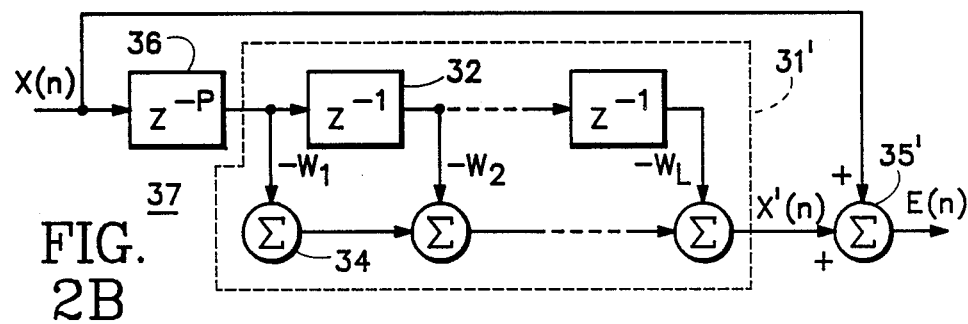
FIG. 2b is a schematic representation of a nulling filter derived form a p-length linear prediction filter.
Figure 2C:
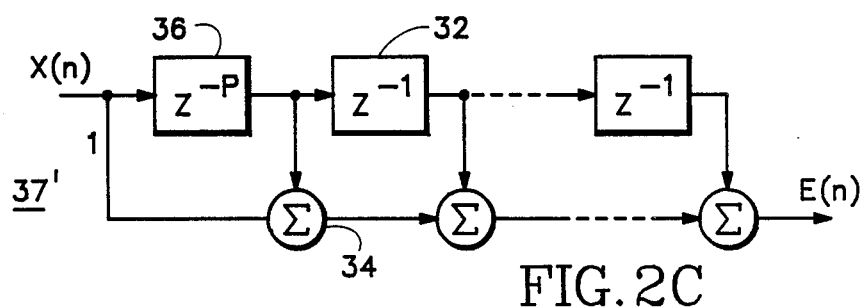
FIG. 2c is a schematic representation of a nulling filter according to the splice detection method of the present invention.

The lower limit is changed relative to equation (2) to be $L+p-1$. By substituting equation (4) into equation (5) the resulting equation becomes $$SUM\{E^2(n)\}=SUM[\{x(n)-w_1x(n-p)-\ldots -w_Lx(n-p-L+1)\}^2] \quad (6)$$

where E(n) corresponds to the output from the structure 37 shown in FIG. 2b. This is the same as the linear predictor of FIG. 2a except: (i) the initial $z^{-1}$ delay element 32 has become a $z^{-p}$ delay element 36; and (ii) the negative sign at the summing element 35 has been distributed over the filter coefficients, i.e., $-w_1$ through $-w_L$, which is the same mathematically and functionally as leaving it at the summing element. The $z^{-p}$ delay element 36 acts to delay the input signal by "p" samples before it is applied to the FIR linear predictor filter 31'. The filter 31' is described by equation (4). FIG. 2c presents a structure 37' that is the same as FIG. 2b both mathematically and functionally, being a FIR filter that produces the error signal of equation (6). In fact the structure 37' directly implements the expression in equation (6), which is the argument of the SUM on the right hand side. This FIR filter is a nulling filter, or a prediction error filter with prediction length p. The filter coefficients are: 1, 0, 0, ..., 0, $-w_1$, $-w_2$, ..., $-w_L$ where the number of zeros between the 1 and $w_1$ is $p-1$. The initial "1" may be viewed as a constraint on the other coefficients, since if it were not there then the filter that has an output closest to zero is an open circuit: not very useful. This filter is the first stage of the splice detection method. The nulling filter is adapted to some length, N, segment of the received signal, and the entire received signal is processed with the resulting filter to null out any decaying exponentials present in the input and leave what is left. Since the received signal contains one or more decaying exponentials, the filter can zero them out, leaving everything that the filter cannot model, namely white noise and splices.

The procedure of adapting the prediction filter to the return signal may be done in several ways. Remembering that the goal of adapting is to find the weights, $w_i$, that minimize the energy of the error between the true and predicted signals, the methods of adaptation may be divided into three categories: iterative, block processing or autocovariance, and analytic methods. There are many slightly differing iterative schemes for finding optimum weights, which schemes are well known in the art.

The block processing or autocovariance method minimizes the error energy in equation (6) in one step as outlined below. If the derivative of the energy SUM$\{E^2(n)\}$ with respect to each weight, $w_i$, $i=1,\ldots,L$, is set to zero, the following vector equation results after simplification $$R\,w=r$$

R is an LxL auto-correlation matrix whose (i,j)th element is computed as $$R_{ij}=SUM\{x(n-i)x(n-j)\} \quad (7)$$

where x(n) is the nth sample of the block of return signal data samples to which adaptation is desired. This summation is over the range of values for $n=L+p-1$ to $N-1$. Likewise r is an $L\times 1$ cross-correlation vector whose ith element is given by $$r_i=SUM\{(x(n)x(n-i)\} \quad (8)$$

over the same range as equation (7). Finally w is the Lx1 vector of desired weights. Its ith element is just $w_i$. Thus equation (7) is a system of L simultaneous equations in L variables written in compact vector notation. When noise is present in the return signal, the solution to equation (7) is well defined and may be written as $$w=R^{-1}r$$

The well known "LU-decomposition" method is used to solve the vector equation rather than explicitly computing $R^{-1}$. The solution of equation (7) produces the desired weights, $w_i$, completing the adaptation part of the splice detection method.

Both the iterative and autocovariance methods may be used when the return signal contains multiple exponentials and noise. However in the common case where the return signal has a single exponential plus white noise, the adaptation procedure may be vastly simplified because an analytic solution to equation (7) may be computed, i.e., a formula for $w_i$ may be derived without having to form the R matrix or solve equation (7) explicitly. The analytic solution produces the weighting coefficients, $w_i$, as a function of an estimated decay rate, a', for the exponential portion of the return signal and the index, i. An algorithm for finding such an estimate of decay rate is disclosed in co-pending U.S. patent application Ser. No. 07/ , filed. [Attorney's Docket No. U.S.A. 4906]

Figure 3A:
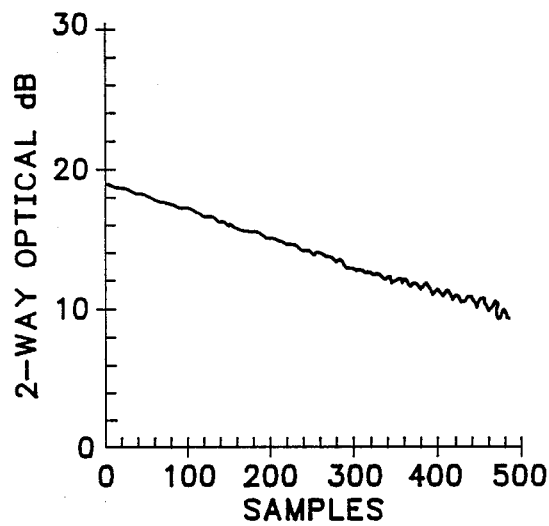
FIGS. 3a, 3b and 3c illustrate the (a) input signal, (b) the error signal, and (c) the noise suppressed error signal resulting from the operation of the splice detection method of the present invention.
Figure 3B:
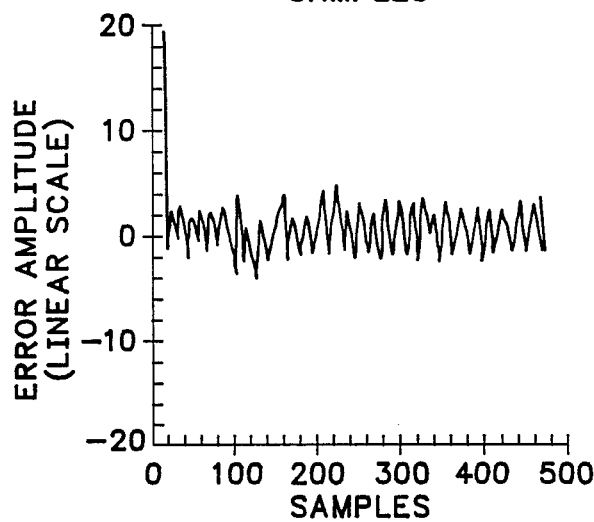

Referring to FIG. 3a a typical return signal is shown having a splice lost in the noise. FIG. 3b shows the same signal after removal of exponentials by the nulling filter. The error signal of FIG. 3b is noise with the splice still hidden. A FIR filter, related to the so-called matched, or correlation, filter from communications theory, is used to increase the SNR of the prediction error sequence, E(n). The splice information, or signal, is buried in the noise. Normally a matched filter is defined to be congruent with the shape of whatever signal one desires to detect, hence the name. However, the non-linear adaptation process of the present method precludes accurate knowledge of the signature of the splice signal in the noisy error sequence. It's approximate shape, though, is known by knowledge of the prediction filter coefficients and the pulse shape of the laser energy that generated the return signal. The filter is, therefore, approximately matched to this shape. In particular when the return signal contains a single exponential, a rectangular or boxcar window may be used for the correlation filter. A somewhat better shaped filter, but more costly to implement, is the Bartlett window. Other shapes are appropriate under different circumstances. The boxcar window is a good compromise between the various shapes that the splice signal may take and the cost of implementation. Better detection may be achieved by other shapes for the correlation filter at the cost of more multiplications.

Figure 3C:
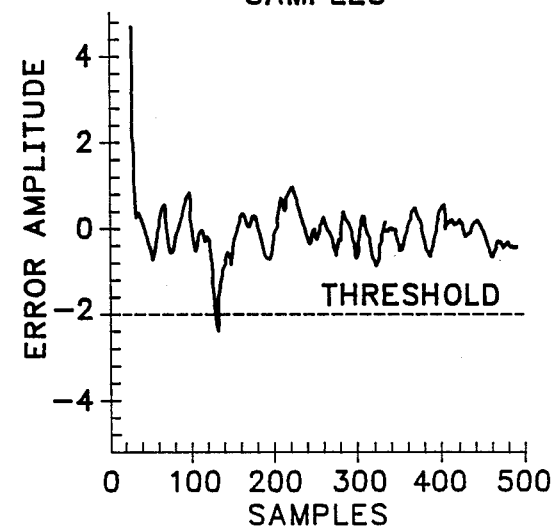

The germane property of the correlation filter is that when a splice signal, having a shape matched to the filter and which is embedded in a white noise sequence, is passed through the filter, the output of the filter on the average attains a maximum at the position of the splice signal. Thus the presence of a splice is detected by comparing the output of the correlation filter with a threshold. The threshold is set so that the output rarely exceeds the threshold when noise alone is present, but does exceed the threshold in the vicinity of the maximum when a splice is present. The threshold is adjusted to trade off between the probability of missing a splice against the probability of ringing a false alarm, i.e., detecting a larger than normal noise peak as a splice. When the boxcar filter is used as the matched filter, the filter length is set to the width of the expected error dip at approximately the $-3$ dB points. Correlating the boxcar filter with the error signal results in the waveform shown in FIG. 3c where the dip from the splice is larger than the dips from the noise alone. By properly adjusting a threshold, the probability of detecting actual splices is maximized while keeping false alarms below some desired minimum.

Figure 4:
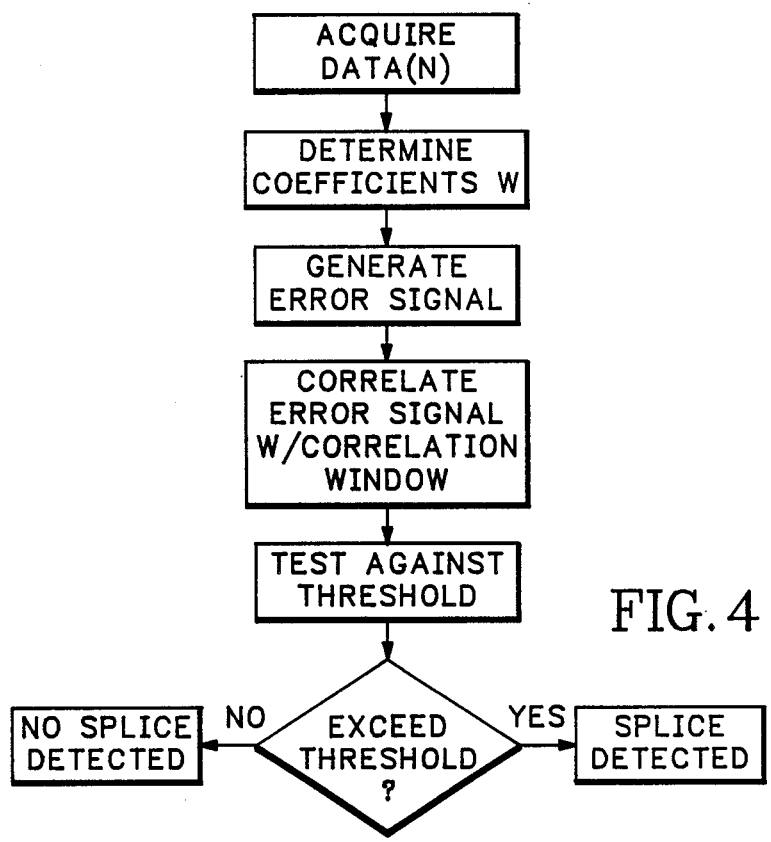
FIG. 4 is a flow chart diagram of the splice detection method according to the present invention.

The prediction error filter is first adapted to an initial segment of the received signal, and then the entire received signal is filtered with the prediction error filter and correlated with the matched filter to produce the error signal to which the threshold is applied. As shown in FIG. 4 the received signal is acquired and stored in the memory device. The coefficients for the nulling filter are determined from the initial segment of the received signal, and then the error signal is generated by applying the nulling filter to the entire received signal The error signal is then correlated with the matched filter to produce the noise reduced error signal that is then tested against a threshold. If any dip in the noise reduced error signal exceeds the threshold, then a splice is detected and the display indicates the location and magnitude of the splice loss.

Thus the present invention provides a method of detecting splices in an optical fiber in the presence of noise by using a nulling filter to remove one or more exponentials in the received signal, using a correlation filter to reduce the noise, and then detecting the splice using a threshold detector.

What is claimed is:

1. A method of detecting a splice in an optical fiber in the presence of noise comprises the steps of:
   applying a nulling filter to a signal received from the optical fiber to remove an exponential from the received signal to produce an error signal; and
   applying a correlation filter to the error signal to detect the splice as a dip in the output signal from the correlation filter that exceeds a predetermined threshold.

2. A method as recited in claim 1 wherein the nulling filter applying step comprises the steps of:
   determining from a segment of the received signal a set of coefficients for the nulling filter; and
   processing the received signal with the nulling filter according to the set of coefficients.

3. A method as recited in claim 2 wherein the determining step comprises:
   generating adaptive finite impulse response filter coefficients, $w_i$, from the segment of the received signal; and
   adding an initial "1" followed by $p-1$ "0" coefficients to produce the nulling filter, where p corresponds to a number of samples of the received signal related to the expected width of the splice.

4. A method as recited in claim 1 where the correlation filter applying step comprises the steps of:
   generating a correlation window adapted to an expected shape of the splice; and
   processing the error signal with the correlation window to reduce noise in the error signal, the splice appearing as a noticeable dip in the correlation filter output signal.

5. A method as recited in claim 4 wherein the correlation filter applying step further comprises the step of passing the correlation filter output signal through a threshold detector having the predetermined threshold so that when the noticeable dip exceeds the predetermined threshold an indicator is set to identify that the splice has been detected.

* * * * *